United States Patent
Ranft et al.

(10) Patent No.: US 7,315,765 B1
(45) Date of Patent: Jan. 1, 2008

(54) AUTOMATED CONTROL THREAD DETERMINATION BASED UPON POST-PROCESS CONSIDERATION

(75) Inventors: Alan Grosvenor Ranft, Austin, TX (US); Daniel Kadosh, Austin, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 46 days.

(21) Appl. No.: 11/192,691

(22) Filed: Jul. 29, 2005

(51) Int. Cl.
G06F 19/00 (2006.01)

(52) U.S. Cl. .................................... 700/108

(58) Field of Classification Search ............ 700/28–55, 700/95–111, 117–121
See application file for complete search history.

(56) References Cited

U.S. PATENT DOCUMENTS

| | | | |
|---|---|---|---|
| 4,796,194 A * | 1/1989 | Atherton ...................... 700/103 |
| 5,862,050 A * | 1/1999 | Toyota .......................... 700/97 |
| 5,907,492 A * | 5/1999 | Akram et al. ................ 700/121 |
| 6,041,270 A * | 3/2000 | Steffan et al. ............... 700/121 |
| 6,112,130 A * | 8/2000 | Fukuda et al. .............. 700/121 |
| 6,415,192 B1 * | 7/2002 | Satoguchi .................... 700/96 |
| 6,516,237 B1 * | 2/2003 | Aoki et al. .................... 700/95 |
| 6,553,276 B2 * | 4/2003 | Akram et al. ................ 700/121 |
| 6,587,744 B1 * | 7/2003 | Stoddard et al. ............ 700/121 |
| 6,622,059 B1 * | 9/2003 | Toprac et al. ................ 700/121 |
| 6,675,058 B1 * | 1/2004 | Pasadyn et al. ............. 700/121 |
| 6,772,035 B2 * | 8/2004 | Mouli ......................... 700/121 |
| 6,853,920 B2 * | 2/2005 | Hsiung et al. ................. 702/1 |
| 6,947,803 B1 * | 9/2005 | Bode et al. .................. 700/121 |
| 7,039,482 B2 * | 5/2006 | Hsu et al. ..................... 700/99 |
| 7,043,321 B2 * | 5/2006 | Ruml et al. .................. 700/100 |
| 2003/0115109 A1 * | 6/2003 | Rogers et al. ................. 705/26 |
| 2003/0182252 A1 * | 9/2003 | Beinglass et al. ............. 706/45 |
| 2004/0236449 A1 * | 11/2004 | Satoguchi et al. .......... 700/103 |
| 2005/0090924 A1 * | 4/2005 | Hsu et al. .................... 700/112 |
| 2005/0094138 A1 * | 5/2005 | Hasan ..................... 356/237.5 |
| 2006/0274306 A1 * | 12/2006 | Hasan ..................... 356/237.5 |
| 2007/0191968 A1 * | 8/2007 | Sikka et al. .................... 700/1 |

* cited by examiner

*Primary Examiner*—M. N. Von Buhr
(74) *Attorney, Agent, or Firm*—Williams, Morgan & Amerson, P.C.

(57) ABSTRACT

A method, apparatus, and a system for determining a control thread based upon a process result are provided. At least one post-process parameter is received. The post parameter relates to a first workpiece upon which a plurality of processes have been performed by a plurality of processing tools. A combination of at least a portion of the plurality of processing tools is selected based upon the post-process parameter.

36 Claims, 7 Drawing Sheets

AUTOMATED CONTROL THREAD DETERMINATION BASED UPON POST-PROCESS CONSIDERATION

BACKGROUND OF THE INVENTION

1. Field of the Invention

This invention relates generally to semiconductor manufacturing, and, more particularly, to a method and apparatus for determining a control sequence based upon at least one post-process consideration.

2. Description of the Related Art

The technology explosion in the manufacturing industry has resulted in many new and innovative manufacturing processes. Today's manufacturing processes, particularly semiconductor manufacturing processes, call for a large number of important steps. These process steps are usually vital, and therefore, require a number of inputs that are generally fine-tuned to maintain proper manufacturing control.

The manufacture of semiconductor devices requires a number of discrete process steps to create a packaged semiconductor device from raw semiconductor material. The various processes, from the initial growth of the semiconductor material, the slicing of the semiconductor crystal into individual wafers, the fabrication stages (etching, doping, ion implanting, or the like), to the packaging and final testing of the completed device, are so different from one another and specialized that the processes may be performed in different manufacturing locations that contain different control schemes.

Generally, a set of processing steps is performed across a group of semiconductor wafers, sometimes referred to as a lot. For example, a process layer that may be composed of a variety of different materials may be formed across a semiconductor wafer. Thereafter, a patterned layer of photoresist may be formed across the process layer using known photolithography techniques. Typically, an etch process is then performed across the process layer using a patterned layer of photoresist as a mask. This etching process results in the formation of various features or objects in the process layer. Such features may be used as, for example, a gate electrode structure for transistors. Many times, trench isolation structures are also formed across the substrate of the semiconductor wafer to isolate electrical areas across a semiconductor wafer. One example of an isolation structure that can be used is a shallow trench isolation (STI) structure.

The manufacturing tools within a semiconductor manufacturing facility typically communicate with a manufacturing framework or a network of processing modules. Each manufacturing tool is generally connected to an equipment interface. The equipment interface is connected to a machine interface to which a manufacturing network is connected, thereby facilitating communications between the manufacturing tool and the manufacturing framework. The machine interface can generally be part of an advanced process control (APC) system. The APC system initiates a control script, which can be a software program that automatically retrieves the data needed to execute a manufacturing process.

FIG. 1 illustrates a typical semiconductor wafer 105. The semiconductor wafer 105 typically includes a plurality of individual semiconductor die 103 arranged in a grid 150. Using known photolithography processes and equipment, a patterned layer of photoresist may be formed across one or more process layers that are to be patterned. As part of the photolithography process, an exposure process is typically performed by a stepper on single or multiple die 103 locations at a time, depending on the specific photomask employed. The patterned photoresist layer can be used as a mask during etching processes, wet or dry, performed on the underlying layer or layers of material, e.g., a layer of polysilicon, metal or insulating material, to transfer the desired pattern to the underlying layer. The patterned layer of photoresist is comprised of a plurality of features, e.g., line-type features or opening-type features that are to be replicated in an underlying process layer.

Turning now to FIG. 2, a flowchart depiction of an illustrative prior art process flow is provided. A manufacturing system may determine the type of product that is to be manufactured by processing wafers (block 210). This determination may be made by analyzing various factors, such as market demands, factory capacity, etc. Based upon the product that is to be manufactured, the manufacturing system may select a processing plan for performing a series of processes upon the wafers (block 220). The processing plan may include various process parameters, such as scheduling parameters, routing parameters, control settings of particular processing tools, etc. Based upon the processing plan, the manufacturing system may direct various factory components to perform a series of processes upon a batch of semiconductor wafers 105 (block 230).

The manufacturing system may acquire metrology data at various points in the series of processes, including at the end of processing of the wafers (block 240). Based upon metrology data and/or post-processing data, the manufacturing system may perform feedback adjustments to subsequently processed wafers (block 240). The feedback correction may include adjusting scheduling, routing and/or process parameters for processing wafers from subsequent batches or lots.

There are various problems associated with the state-of-the-art methodology. One of these problems includes the fact that current feedback corrections relating to scheduling of wafers are generally based upon individual tool performance. This may be problematic because processing tools may not operate consistently during different instances of operations. Generally, state-of-the-art analysis is based upon an assumption that tools generally behave substantially identically for a given process operation at various instances. This assumption may not hold true, resulting in errors relating to process analysis.

Additionally, unexplained variations in process results may occur. In other words, for a given operation, tools may not be sufficiently matched, and therefore, may not produce similar results across several operations. Hence, for a specific process routing sequence, results may contain unexplained variations in different executions of the same sequence. These unexplained variations may cause inefficiencies in feedback corrections (e.g., adjusting parameters relating to scheduling, routing, etc.), thereby reducing the yield and/or degrading the performance of the processed wafers. The state-of-the-art generally lacks efficient methods for adjusting the scheduling or routing of a set of wafers through a series of process steps based upon interaction between the various components relating to the process steps.

The present invention is directed to overcoming, or at least reducing, the effects of one or more of the problems set forth above.

SUMMARY OF THE INVENTION

In one aspect of the present invention, a method is provided for determining a control thread based upon a process result. At least one post-process parameter is received. The post parameter relates to a first workpiece upon which a plurality of processes have been performed by a plurality of processing tools. A combination of at least a portion of the plurality of processing tools is selected based upon the post-process parameter.

In another aspect of the present invention, a method is provided for determining a control thread based upon a process result. A plurality of processes is performed upon a workpiece. An end of line parameter relating to the workpiece is received. A combination of at least two processing tools is determined based upon the end of line parameter.

In yet another aspect of the present invention, a method is provided for determining a control thread based upon a process result. A plurality of processes is performed upon a first workpiece using upon a first combination of tools. A first end of line parameter relating to the first workpiece is acquired. A plurality of processes are performed upon a second workpiece using upon a second combination of tools. A second end of line parameter relating to the second workpiece is acquired. At least one of the first and second combination of tools is selected for processing an additional workpiece based upon the first and second end of line parameters.

In another aspect of the present invention, a method is provided for determining a control thread based upon a process result. A plurality of processes is performed upon a first workpiece using upon a first combination of tools. A first end of line parameter relating to the first workpiece is acquired. A plurality of processes are performed upon a second workpiece using upon a second combination of tools. A second end of line parameter relating to the second workpiece is acquired. A third combination of tools is determined for processing a third workpiece based upon the first and second end of line parameters.

In another aspect of the present invention, a method is provided for determining a control thread based upon a process result. A first workpiece is processed based upon a first control thread. A first end of line parameter relating to the first workpiece is acquired. A second workpiece is processed based upon a second control thread. A second end of line parameter relating to the second workpiece is acquired. The first and second end of line parameters are compared. The first control thread or the second control thread is selected for processing additional workpieces based upon the comparing of the first and second end of line parameters.

In another aspect of the present invention, a system is provided for determining a control thread based upon a process result. The system includes a plurality of processing tools for processing a first workpiece based upon a first control thread, and processing a second workpiece based upon a second control thread. The system also includes a device for determining a first end of line parameter relating to the first workpiece or a second end of line parameter relating to the second workpiece. The system also includes a controller adapted to select the first control thread or the second control thread based upon a comparison of the first end of line parameter and the second end of line parameter.

In another aspect of the present invention, an apparatus is provided for determining a control thread based upon a process result. The apparatus includes a controller to select a first control thread used to process a first workpiece, or a second control thread used to process a second workpiece. The controller is adapted to make the selection in response to a comparison of the first end of line parameter and the second end of line parameter.

In yet another aspect of the present invention, a computer readable program storage device encoded with instructions is provided for determining a control thread based upon a process result. The method includes receiving at least one post-process parameter relating to a first workpiece upon which a plurality of process has been performed by a plurality of processing tools. The method also includes selecting a combination of the plurality of processing tools based upon the post-process parameter.

BRIEF DESCRIPTION OF THE DRAWINGS

The invention may be understood by reference to the following description taken in conjunction with the accompanying drawings, in which like reference numerals identify like elements, and in which.

Figure 1:
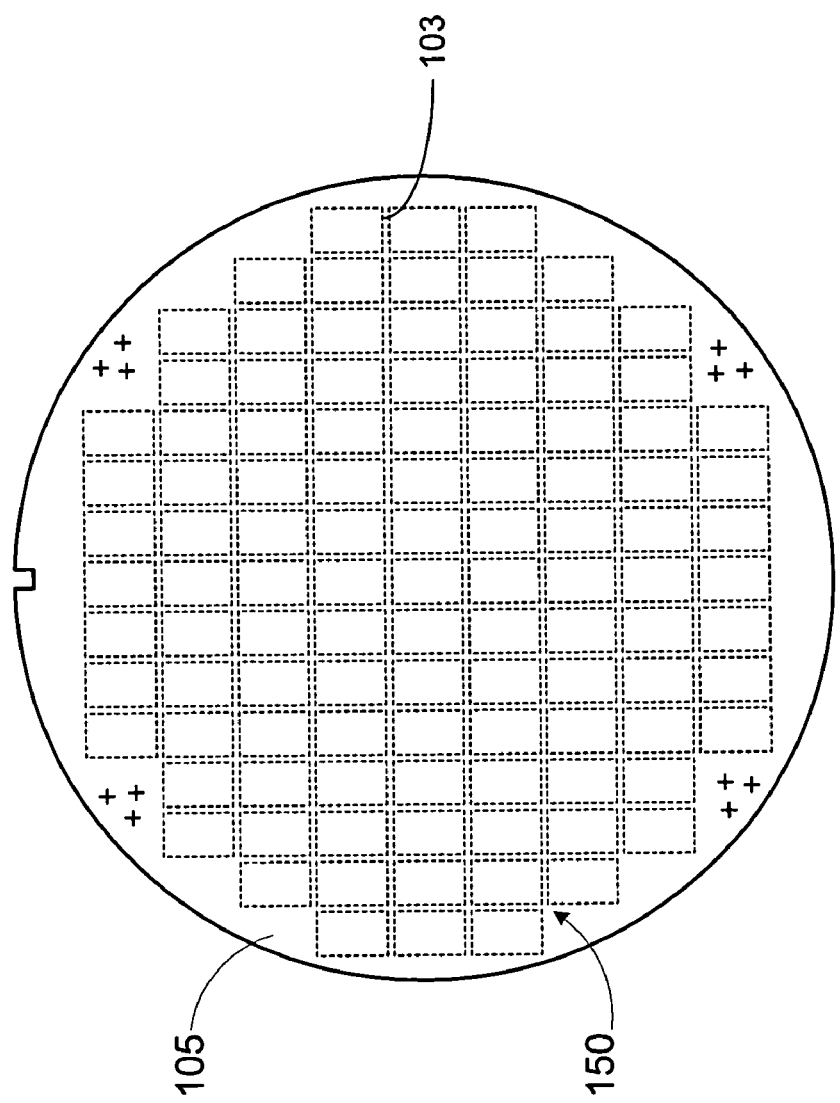
FIG. 1 illustrates a stylized depiction of a semiconductor wafer that may be processed by a semiconductor manufacturing system.
Figure 2:
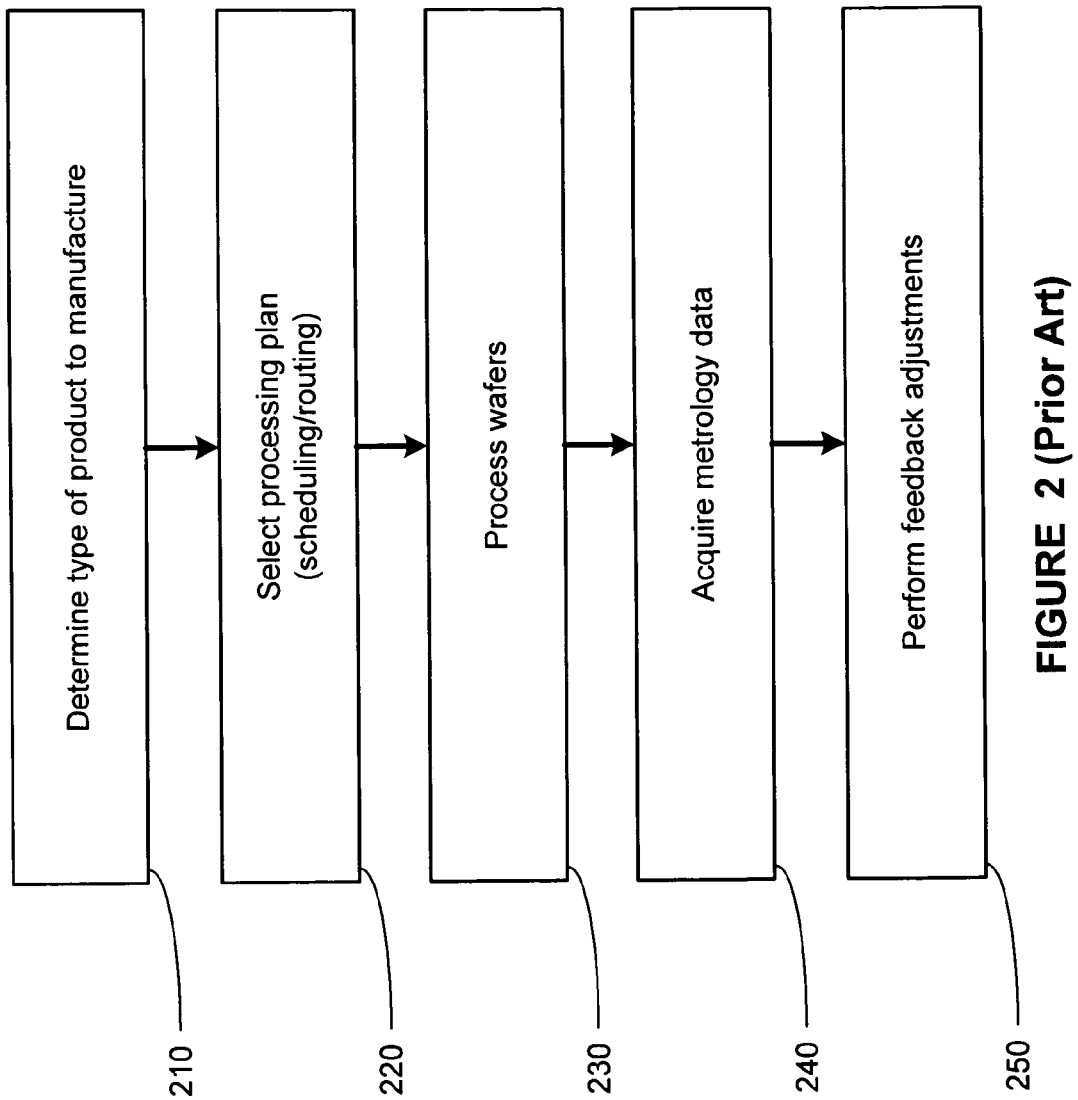
FIG. 2 illustrates a flowchart depiction of a prior art method for processing semiconductor wafers.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will, of course, be appreciated that in the development of any such actual embodiment, numerous implementation-specific decisions may be made to achieve the developers' specific goals, such as compliance with system-related and business-related constraints, which may vary from one implementation to another. Moreover, it will be appreciated that such a development effort might be complex and time-consuming, but may nevertheless be a routine undertaking for those of ordinary skill in the art having the benefit of this disclosure.

The present invention will now be described with reference to the attached figures. Various structures, computers, process tools, and systems are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Portions of the invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

There are many discrete processes that are involved in semiconductor manufacturing. Many times, workpieces (e.g., semiconductor wafers 105, semiconductor devices, etc.) are stepped through multiple manufacturing process tools. Embodiments of the present invention provide for performing an analysis of process results and correlating them to a particular combination of processing tools. The process results, such as yield data, product-operation data, and/or other end-of-line parameters, may be correlated to a specific group of processing tools. Desired results, such as yields, factory throughput, and/or factory utilization, may be correlated to particular tool combinations or control threads. Based upon this correlation, a routing and/or scheduling process for performing process steps upon wafers may be modified or further defined. Embodiments of the present invention also provide for focusing on critical process steps and correlating ensuing process results to certain control threads relating to the critical process steps.

A baseline standard may be developed by processing a particular set of wafers using known superior tool combinations to obtain the substantially best results possible (e.g., yield, performance, etc.) by a particular combination of processing tools. The baseline results may be used to characterize yield or performance results in order to perform a statistical analysis relating to desirable yields/performance results and analyze how they correlate to particular control threads.

Figure 3:
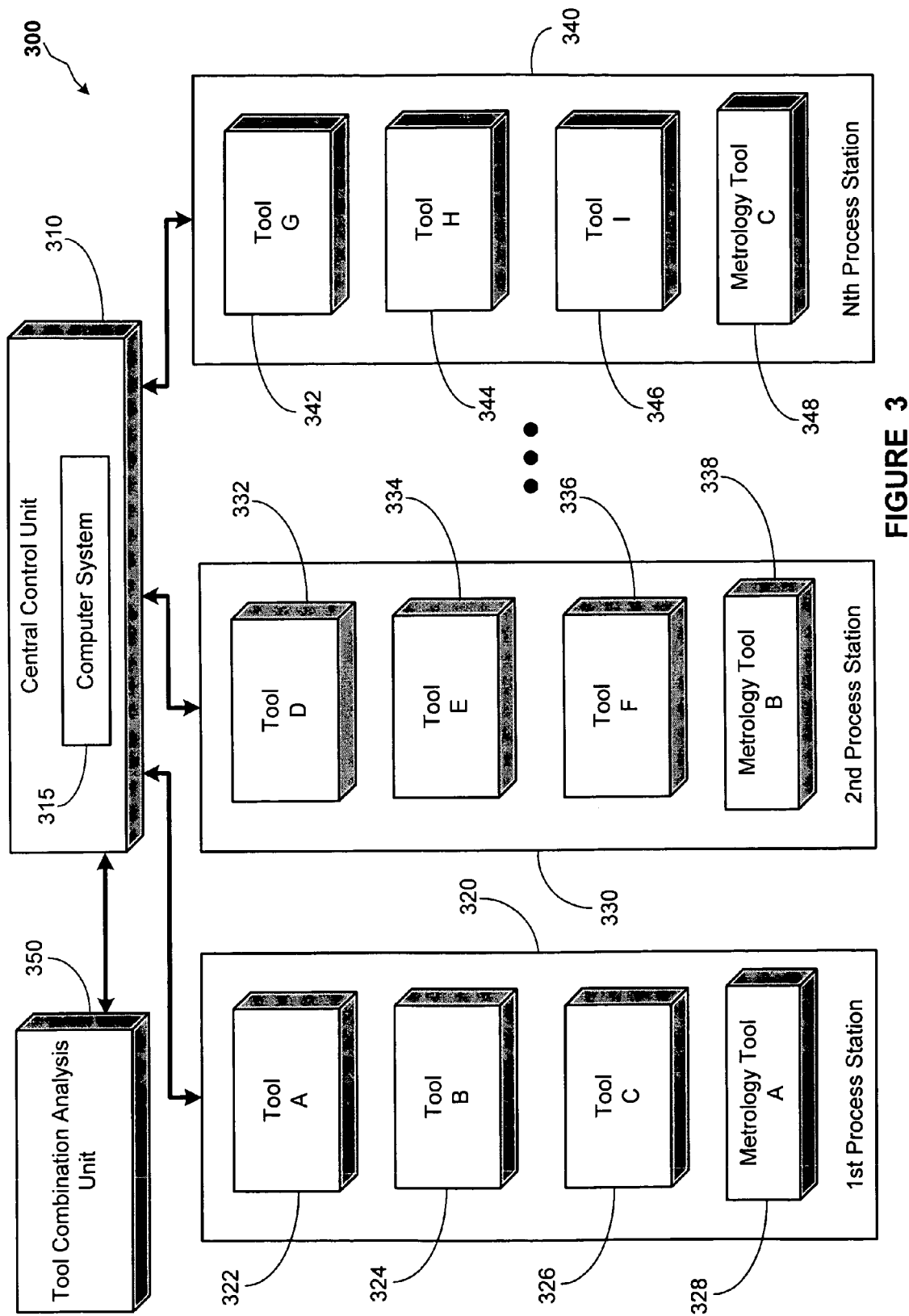
FIG. 3 illustrates a block diagram of a system depicting a central control unit for controlling a plurality of factory components, in accordance with one illustrative embodiment of the present invention.

Turning now to FIG. 3, a block diagram depiction of a system, in accordance with an illustrative embodiment of the present invention, is provided. The system 300 may comprise a central control unit 310 that is capable of controlling various components of the system 300. The central control unit 310 is capable of overseeing and affecting the respective operations of a plurality of process control segments in a factory/fab. For example, a factory may comprise various processing tools that are controlled by one or more tool controllers that may be part of a process station. The central control unit 310 is capable of receiving and/or generating data and/or instructions to affect the operation of various components of a factory. A computer system 315 associated with the central control system 310 is capable of performing various tasks, such as calculating recipe parameters and generating scheduling/routing and other control parameters to direct the operation of the various components of the system 300.

The system 300 may also comprise a $1^{st}$ processing station 320, a $2^{nd}$ processing station 330, through an $N^{th}$ processing station 340. The $1^{st}$ through $N^{th}$ processing stations 320, 330, 340 may each comprise a plurality of processing components that are associated with a particular type of process. For example, the $1^{st}$ processing station 320 may be a photolithography process area, which may comprise various processing tools that are capable of performing photolithography processes. The $1^{st}$ processing station 320 may comprise a processing tool A 320, a processing tool B 324, and a processing tool C 326. Each of these processing tools is capable of performing a particular type of process, such as a photolithography process.

Additionally, the $1^{st}$ processing station 320 may comprise a metrology tool A 328. The metrology tool A 328 is capable of acquiring metrology data, including wafer electrical test (WET) data relating to wafers processed by the tools in the $1^{st}$ processing station 320. Similarly, the $2^{nd}$ processing station 330 may comprise a processing tool D 332, a processing tool E 334, a processing tool F 336, and a metrology tool B 338. Further, the $N^{th}$ processing station 340 may comprise a processing tool G 342, a processing tool H 344, a processing tool 1346, and a metrology tool C 348. The illustration of the tools in the various processing stations is based upon an exemplary number of tools. Those skilled in the art would appreciate that a different number of tools or other components may be associated with a particular process station and remain within the scope of the present invention.

The system 300 may define a control thread or a process thread, to control the operation of various process steps performed on a semiconductor wafer 105. The control thread, or the process thread, may refer to a series of process steps that are to be performed by a specific processing tool or by a specific set of processing tools. For example, a control thread may define a series of process steps to be performed by selected tools in the $1^{st}$ through $N^{th}$ processing stations 320, 330, 340. As an example, a particular process/control thread may call for a process step to be performed by tool A 322 in the $1^{st}$ processing station 320, followed by a process step to be performed by tool E 334 in the $2^{nd}$ processing station 330, followed by a process step to be performed by tool G 342 in the $N^{th}$ processing station 340.

As an illustrative example, a process designated to be performed by a stepper may be performed by tool B 324 in the $1^{st}$ processing station. The wafer may then be routed to the $2^{nd}$ processing station 330, which may be an etch process station, wherein the tool F 336 may perform an etch process on the wafer. Subsequently, the wafer may be routed to the $N^{th}$ processing station 340, which may be a plasma tool station where tool G 342 may perform a plasma deposition process upon the wafer. The central control unit 310 is capable of routing the wafers through the various process stations in the system 300 and keeping track of associated routing and scheduling. Embodiments of the present invention provides for correlating the post-process results with specific control threads.

The system 300 may also comprise a tool combination analysis unit 350. The tool combination analysis unit 350 may be a software, hardware or a firmware component, or may be formed by any combination thereof. In alternative embodiments, the tool combination analysis unit 350 may be a part of the central control unit 310. The tool combination analysis unit 350 is capable of analyzing various post-process parameters, such as yield, performance (e.g., operation speed, data processing speed, etc.), and the like. The analysis of the post-processing parameters may then be correlated to particular tool groups in the system 300. For example, the tool combination analysis unit 350 may correlate various control threads that define specific tool combinations described above, and correlate them to superior, average, or inferior process results. A baseline process result may be determined by routing known wafers through known tool combinations that are known to be superior to determine a standard for the best possible yield or performance parameter possible. The tool combination analysis unit 350 may then compare the actual post-process parameters to the baseline parameters to provide data relating to a relative quality-assessment of the post-process results. The tool combination analysis unit 350 may then correlate various qualities of the post-process result(s) to a particular control threads. Statistical analyses, which may be known to those skilled in the art having benefit of the present disclosure, may be used to define the correlation. A more detailed description of the tool combination analysis unit 350 is provided in FIG. 4 and accompanying description below.

Figure 4:
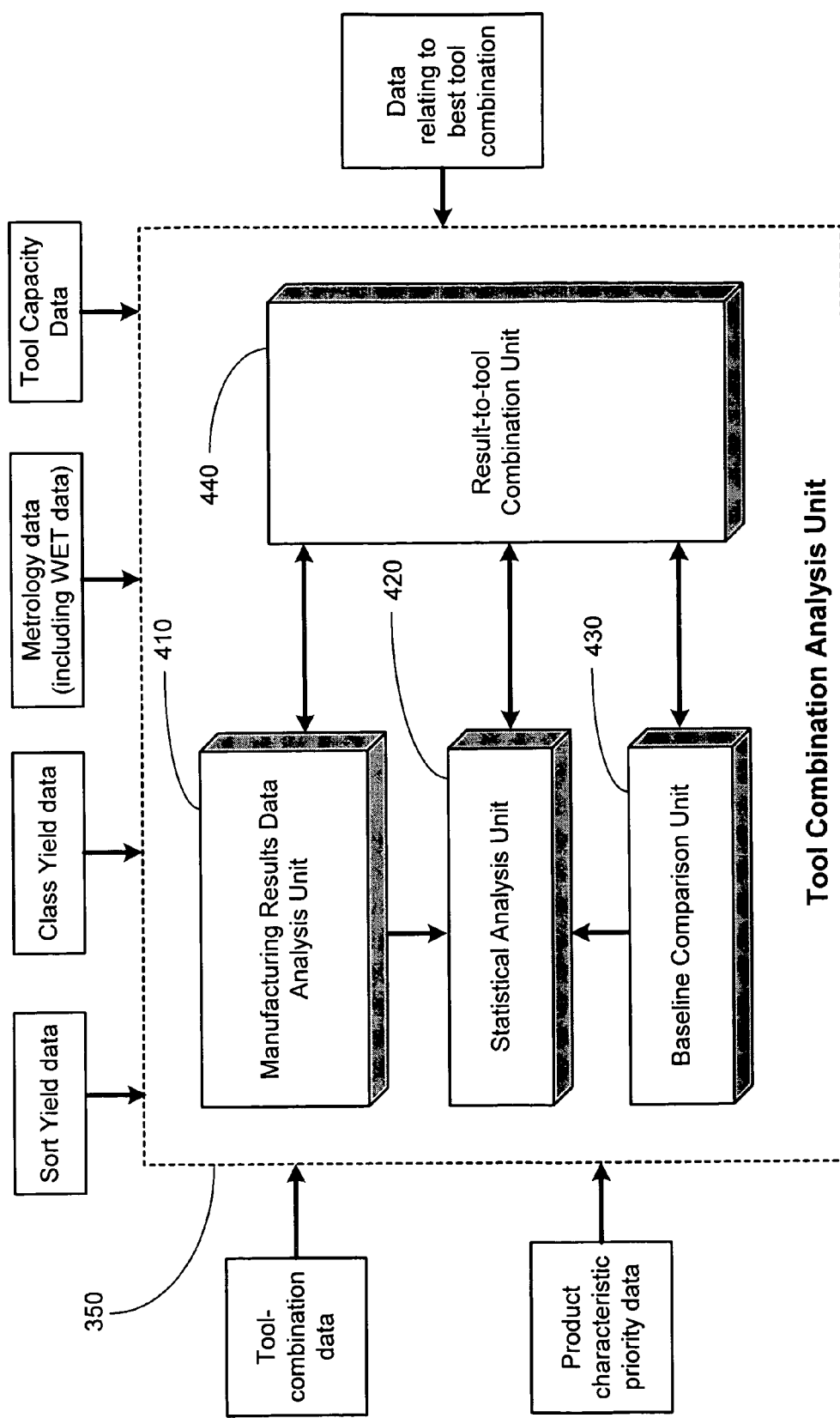
FIG. 4 provides a block diagram depiction of a tool combination analysis unit of FIG. 3, in accordance with an illustrative embodiment of the present invention.

Turning now to FIG. 4, a block diagram depiction of the tool combination analysis unit 350, in accordance with an illustrative embodiment of the present invention is provided. In one embodiment, the various blocks of the tool combination analysis unit 350 may represent software components, such as algorithms, etc. The tool combination analysis unit 350 may receive various manufacturing and post-process data. For example, the tool combination analysis unit 350 may receive sort yield data, which may refer to die-level testing that is performed on processed wafers subsequent to the conclusion of a set of process steps performed on the wafers. The sort yield may include testing the full functionality of different dye on each wafer. The sort yield may provide a percentage yield that is recorded at the sort testing operation phase.

Additionally, the tool combination analysis unit 350 may receive metrology data (i.e., inline data), which may include WET data from various points during the above-described series of process steps. Furthermore, the unit 350 may also receive class yield data. The class yield data may refer to the product that is manufactured from the individual die on the wafers. Generally, the class yield is determined after the various die on the wafer is cut and separated into packages. Performance factors of the products resulting from the processing of wafers may be measured and recorded during the class yield analysis.

Further, the tool combination analysis unit 350 may also receive tool capacity data, which may be interleaved with the tool combination data. This data may relate to the various combinations of tools that were used to define the control threads. Based upon the tool combinations slated for processing as defined by the control threads, the capacity of the various processing stations may be determined. Furthermore, the unit 350 may also receive priority data relating to certain product characteristics. This data may include hierarchy information for prioritizing the desirability of certain post-process characteristics of the product, e.g., prioritizing yield results over performance results, etc. For some products, such as microprocessors, a predetermined amount of yield, as well as performance, is generally desired. In contrast, other products, such as flash memory devices, may call for a larger emphasis upon yield since the performance of these products, as compared to a more complex devices, is less sophisticated. Therefore, the unit 350 may take into account the type of post-process data to prioritize.

The tool combination analysis unit 350 may comprise a manufacturing results data analysis unit 410. The data analysis unit 410 is capable of analyzing post-process data and metrology data to determine the overall manufacturing results. This may include an analysis of the performance and/or the yield of the processed wafers, while also taking into account various inline and/or offline metrology data. The resulting data may then also be used by a statistical analysis unit 420 in the unit 350. The statistical analysis unit 420 may comprise one or more algorithms that are capable of correlating various manufacturing results to the scheduling/routing of wafers. The statistical analysis unit 420 may also correlate the manufacturing results to the operations performed by various tool combinations in relation to the control threads that were used to control the processes that provided the manufacturing results.

The statistical analysis unit 420 may also take into account baseline comparison data from a baseline comparison unit 430. The baseline comparison unit 430 may compare manufacturing results to stored or modeled baseline process results data. The unit 350 may also comprise a results-to-tool combination unit 440. This unit 440 may use statistical analysis data relating to tool combination and manufacturing results, as well as the baseline comparison data, in order to correlate particular tool combination to particular process results. Therefore, the tool combination analysis unit 350 provides data relating to the various tool combinations. This information may be used to rank several tool combinations in accordance with potential manufacturing results, such as yield and performance, as well as taking into account factory throughput. Factory throughput may be of interest since some tool combinations may result in excessive idleness of a particular tool in a process station, which may lead to an underutilization of factory capacity. Based upon the data from the tool combination analysis unit 350, tool scheduling of subsequent wafers may be enhanced.

Figure 5:
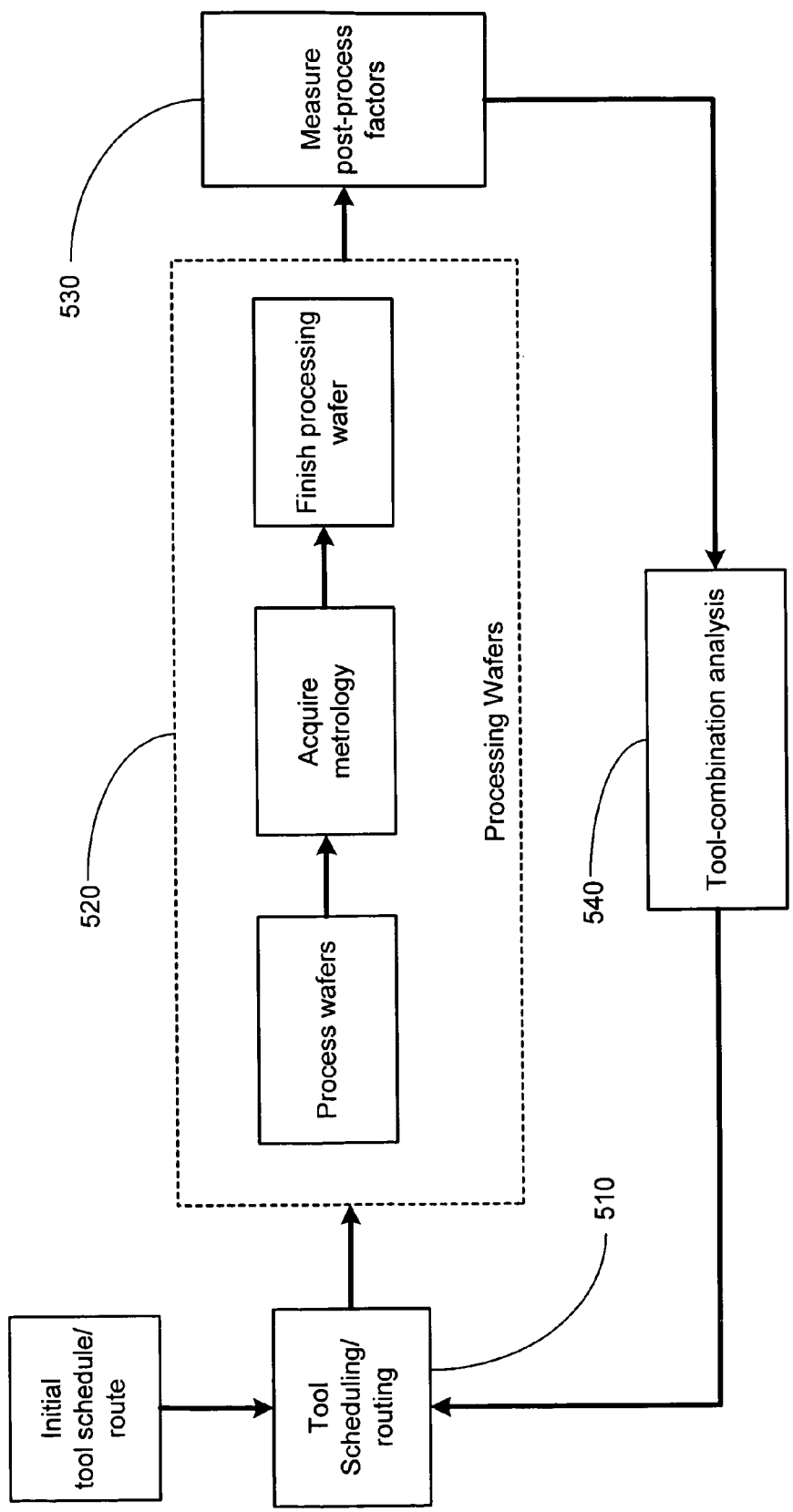
FIG. 5 illustrates a feedback path in accordance with an illustrative embodiment of the present invention.

Turning now to FIG. 5, an illustrative feedback path, in accordance with an embodiment of the present invention, is provided. A tool scheduling/routing process (block 510) may provide scheduling and routing information for processing wafers throughout the various process stations in the system 300. The tool scheduling step includes using data relating to an initial tool schedule/route provided by the central control unit 310. Additionally, the tool scheduling process may involve updating the tool scheduling and/or routing of wafers based upon feedback data. Based upon the tool scheduling, the system 300 performs various processes on the wafers (block 520). This may include initial wafer processing, acquisition of manufacturing data (e.g., metrology data, tool state data, etc.), followed by further processing of the wafers. Upon processing of the wafers, yield, performance, and/or other post-process characteristics may be determined (block 530). This process may include performing various post processing measurements.

Based upon the post-process measurements from block 530, a tool combination analysis is performed (block 540). This step provides for correlating particular process results to certain tool combinations defined by a control thread. Based upon this correlation, the system 300 may determine that certain combination of tools defined by the control threads may be advantageous. Accordingly, based upon this analysis, the system 300 may rearrange certain scheduling and or routing of wafers. Utilizing the feedback path illustrated in FIG. 5, wafers may be processed in such a manner to provide increased yield, improved product performance, and/or more desirable tool utilization.

Figure 6:
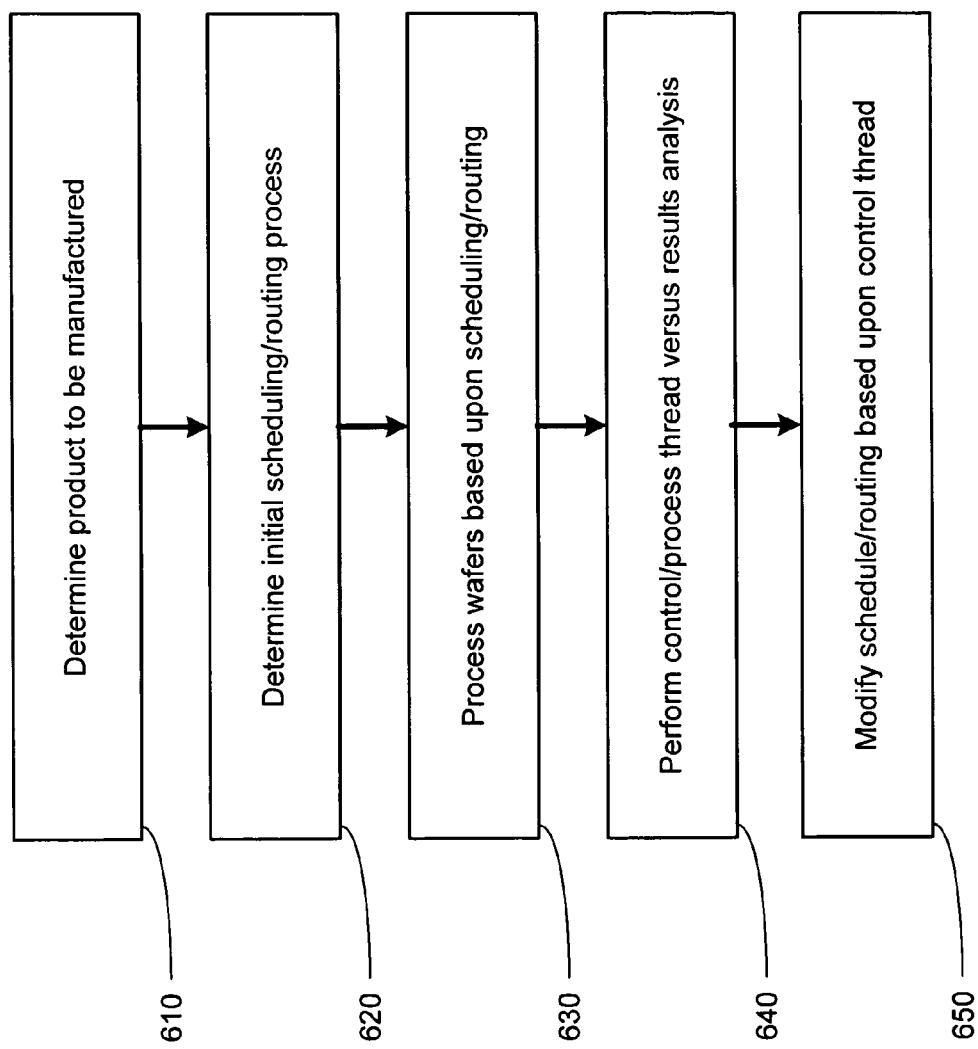
FIG. 6 provides a flowchart depiction of a method in accordance with an illustrative embodiment of the present invention.

Turning now to FIG. 6, a flowchart depiction of the steps of the method in accordance with an illustrative embodiment of the present invention, is provided. The system 300 may determine a particular product that is to be manufactured (block 610). This determination may be performed by analyzing several internal and/or external factors, such as market demands, factory capacity, etc. For example, a determination may be made to manufacture processors or flash memory devices based upon available processing resources as well as market demand for flash memory. The system 300 may then determine an initial scheduling/routing process based upon the type(s) of product to be manufactured (block 620). For example, the initial scheduling routing process may be associated with a particular control thread that calls for routing of wafers from the $4^{st}$ processing station tool D 324, to a tool F 336 in the $2^{nd}$ processing station 330, to a tool G 342 in the $N^{th}$ process station 340 (as illustrated in FIG. 3). Based upon this initial scheduling/routing, the system 300 may then process the wafers (block 630).

Upon processing at least one semiconductor wafer 105 in a batch of wafers, the system 300 may perform a control/process thread versus results analysis (block 640). The process thread versus results analysis may provide an indication of a particular tool combination that may be defined by a control thread that provides more desirable yield/or process performance. A more detailed description of the process thread versus results analysis is provided in FIG. 7 and accompanying description below. Upon performance of the control thread versus results analysis, the system 300 may modify the scheduling/routing of wafers within the same lot, or wafers in subsequent batches or lots (block 650). Therefore, continued improvements and/or enhancements of yields and/or performance may be achieved by adjusting the tool combination routing/scheduling for processing wafers.

Figure 7:
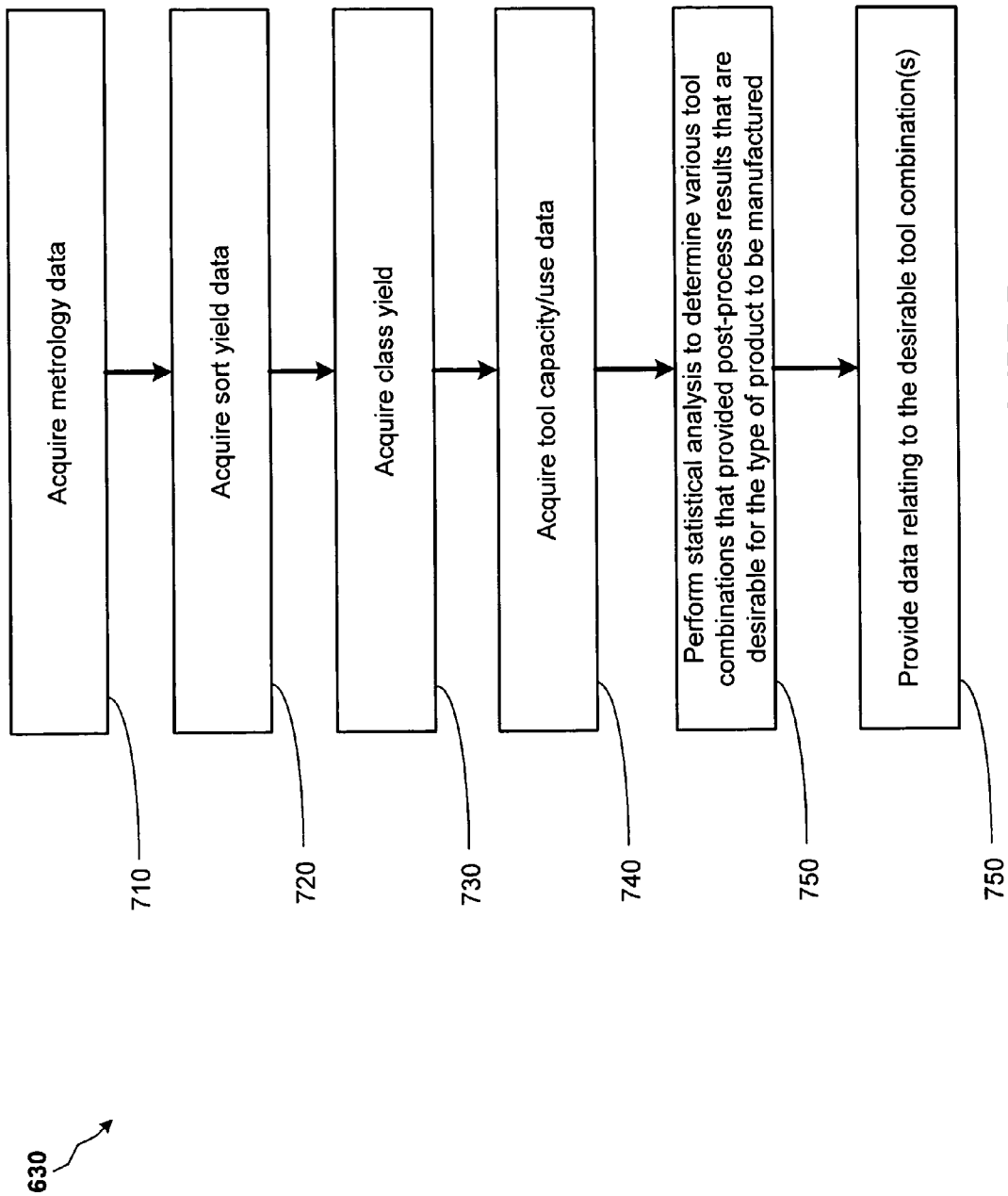
FIG. 7 illustrates a flowchart depiction of the steps associated with performing a process thread versus results analysis of FIG. 6, in accordance with an illustrative embodiment of the present invention.

Turning now to FIG. 7, a more detailed flowchart depiction of the steps of performing the process thread versus results analysis of block 640 of FIG. 6, is illustrated. Throughout various points in the series of process steps performed on the wafers, the system 300 may acquire metrology data (block 710). The metrology data may include wafer electrical test (WET) data, critical dimension measurements, etc., that may be performed at various points of the processing stream or by standalone metrology units. The system 300 may also acquire sort yield data (block 720), as well as class yield data (block 730). Furthermore, the system 300 may also monitor the tool capacity/use data, which tracks the usage of the various tools in the various processing stations described above (block 740). This information may be used to determine whether the factory capacity is underutilized.

Based upon the various data acquired by the system 300, a statistical analysis based upon the data and certain tool combinations may be performed (block 750). The statistical analysis may be used to determine various tool combinations that provide post-process results that are desirable for a particular type of product being manufactured. For example, if processors (e.g., microprocessors) are being manufactured, yield and performance issues may be weighted heavily in determining the correlation of particular tool combinations or control threads that provided process results. This correlation may be balanced with the desire to maintain a predetermined amount of factory throughput.

If, for example a memory product, e.g., flash memory, is being manufactured, many performance factors related to a more complex device such as a micro-processor, may not be analyzed. In the case of manufacturing flash memory, greater emphasis may be placed upon yield factors. Therefore, for a relatively simple device such as a memory device, the control process versus results analysis may entail placing a greater emphasis in yield results when identifying a favorable control/process thread. The correlation between the process threads and post-process results of the memory device may also be analyzed in light of a predetermined amount of factory throughput. In other words, process threads that define particular favorable tool combinations may be tempered with data relating to factory throughput in order to reduce underutilization of factory components. Certain tool combinations that seem ideal for maximizing yield and performance may be modified to include tools that otherwise may have been excessively idle. Based upon the correlation analysis provided by the statistical analysis, data relating to one or more desirable tool combinations is provided to the system (block 760). Based upon this data, scheduling/routing of subsequent process wafers may be amended to provide increased yields, performance or other post-process results, while maintaining predetermined amount of factory throughput.

The analysis provided by the correlation described above may be used to identify various causes of tool mismatch, wherein corrective actions to improve tool performance may be performed. Additionally, in an alternative embodiment, the control thread correlation and modification described herein may be limited to critical process steps. In other words, the analysis provided herein may be targeted to modify process steps that more heavily affect post-process results, such as yield and performance. Therefore, the control thread modifications may be directed only to critical process steps. However, the correlation analysis provided by embodiments of the present invention may be used to modify scheduling, routing, and/or tool combination of all processes performed by the system 300.

Embodiments of the present invention may be used to improve various post-process qualities, such as class yields, sort yields, performance measurements, and/or factory throughput. Embodiments of the present invention provide for the novel correlations of various tool combinations or control threads that provide desirable post-process results. Based upon the analysis provided by the embodiments of the present invention, more efficient control threads may be formulated to provide desirable post-process results.

The principles taught by the present invention can be implemented in an Advanced Process Control (APC) Framework, such as a Catalyst system formerly offered by KLA Tencor, Inc. The Catalyst system uses Semiconductor Equipment and Materials International (SEMI) Computer Integrated Manufacturing (CIM) Framework compliant system technologies, and is based on the Advanced Process Control (APC) Framework. CIM (SEMI E81-0699—Provisional Specification for CIM Framework Domain Architecture) and APC (SEMI E93-0999—Provisional Specification for CIM Framework Advanced Process Control Component) specifications are publicly available from SEMI. The APC framework is a preferred platform from which to implement the control strategy taught by the present invention. In some embodiments, the APC framework can be a factory-wide software system; therefore, the control strategies taught by the present invention can be applied to virtually any of the semiconductor manufacturing tools on the factory floor. The APC framework also allows for remote access and monitoring of the process performance. Furthermore, by utilizing the APC framework, data storage can be more convenient, more flexible, and less expensive than local drives. The APC framework allows for more sophisticated types of control because it provides a significant amount of flexibility in writing the necessary software code.

Deployment of the control strategy taught by the present invention onto the APC framework could require a number of software components. In addition to components within the APC framework, a computer script is written for each of the semiconductor manufacturing tools involved in the control system. When a semiconductor manufacturing tool in the control system is started in the semiconductor manufacturing fab, it generally calls upon a script to initiate the action that is required by the process controller, such as the overlay controller. The control methods are generally defined and performed in these scripts. The development of these scripts can comprise a significant portion of the development of a control system. The principles taught by the present invention can be implemented into other types of manufacturing frameworks.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular embodiments disclosed above may be altered or modified and all such variations are considered within the scope and spirit of the invention. Accordingly, the protection sought herein is as set forth in the claims below.

What is claimed is:

1. A method, comprising:
    receiving at least one post-process parameter relating to a first workpiece upon which a plurality of processes have been respectively performed by a plurality of processing tools; and
    selecting a combination of at least a portion of said plurality of processing tools based upon said post-process parameter.

2. The method of claim 1, further comprising processing a second workpiece based upon said combination of said plurality of processing tools.

3. The method of claim 2, further comprising processing a subsequent workpiece.

4. The method of claim 1, wherein providing said first workpiece comprises providing a semiconductor wafer.

5. The method of claim 1, further comprising correlating said post process parameter to said combination of tools used to process said first workpiece.

6. The method of claim 1, wherein receiving said post-process parameter relating to said first workpiece comprises receiving an end of line parameter.

7. The method of claim 1, wherein receiving said post-process parameter relating to said first workpiece comprises receiving a yield parameter.

8. The method of claim 1, wherein receiving said yield parameter further comprise receiving at least one of a sort yield parameter and a class yield parameter.

9. The method of claim 1, wherein receiving said post-process parameter relating to said workpiece comprises receiving a performance parameter.

10. The method of claim 1, wherein selecting said combination of said at least a portion of said plurality of processing tools comprises selecting a control thread.

11. The method of claim 1, wherein selecting said combination of said at least a portion of said plurality of processing tools comprises performing a statistical analysis.

12. A method, comprising:
    performing a plurality of processes upon a workpiece;
    receiving an end of line parameter relating to said workpiece; and
    determining a combination of at least two processing tools based upon said end of line parameter.

13. The method of claim 12, wherein receiving said end of line parameter relating to said workpiece further comprises receiving at least one of a yield parameter and a performance parameter.

14. A method, comprising:
    performing a plurality of processes upon a first workpiece using a first combination of tools;
    acquiring a first end of line parameter relating to said first workpiece;
    performing a plurality of processes upon a second workpiece using upon a second combination of tools;
    acquiring a second end of line parameter relating to said second workpiece;
    selecting at least one of said first and second combination of tools for processing an additional workpiece based upon said first and second end of line parameters.

15. The method of claim 14, further comprising processing additional workpieces.

16. A method, comprising:
    performing a plurality of processes upon a first workpiece using a first combination of tools;
    acquiring a first end of line parameter relating to said first workpiece;
    performing a plurality of processes upon a second workpiece using upon a second combination of tools;
    acquiring a second end of line parameter relating to said second workpiece;
    determining a third combination of tools for processing a third workpiece based upon said first and second end of line parameters.

17. The method of claim 16, further comprising processing additional workpieces.

18. The method of claim 15, wherein determining said third combination of tools further comprises performing a statistical analysis to provide a predetermined third end of line parameter.

19. A method, comprising:
    processing a first workpiece based upon a first control thread;

acquiring a first end of line parameter relating to said first workpiece;

processing a second workpiece based upon a second control thread;

acquiring a second end of line parameter relating to said second workpiece;

comparing said first and second end of line parameters; and selecting at least one of said first control thread and said second control thread for processing additional workpieces based upon said comparing of said first and second end of line parameters.

20. The method of claim 19, further comprising processing additional workpieces.

21. The method of claim 19, wherein selecting at least one of said first control thread and said second control thread further comprises performing a statistical analysis based upon a comparison of at least one of a yield and parameter and a performance parameter.

22. A system, comprising:
a plurality of processing tools for processing a first workpiece based upon a first control thread, and processing a second workpiece based upon a second control thread;

a device for determining at least one of a first end of line parameter relating to said first workpiece and a second end of line parameter relating to said second workpiece and a controller to select at least one of said first control thread and said second control thread based upon a comparison of said first end of line parameter and said second end of line parameter.

23. The system of claim 22, wherein said processing tool being adopted to process a subsequent workpiece.

24. The system of claim 23, further comprising a statistical analysis unit to perform a statistical analysis to generate a third control thread to process said subsequent workpiece.

25. The system of claim 22, wherein said first and second end of line parameter is at least one of a yield parameter and a performance parameter.

26. The system of claim 22, said controller being further adapted to determine a baseline end of line parameter based upon a baseline tool combination.

27. The system of claim 22, wherein said first workpiece is a semiconductor wafer and said second workpiece is a semiconductor wafer.

28. An apparatus, comprising:
a controller to select at least one of said first control thread used to process a first workpiece and a second control thread used to process a second workpiece, said controller to select in response to a comparison of a first end of line parameter associated with said first workpiece and a second end of line parameter associated with said second workpiece.

29. The apparatus of claim 28, said controller being capable of performing a statistical analysis to generate a third control thread for processing a third workpiece.

30. The apparatus of claim 28, wherein said first workpiece is a semiconductor wafer and said second workpiece is a semiconductor wafer.

31. An apparatus, comprising:
means for receiving at least one post-process parameter relating to a first workpiece upon which a plurality of processes has been performed by a plurality of processing tools; and means for selecting a combination of said plurality of processing tools based upon said post-process parameter.

32. A computer readable program storage device encoded with instructions that, when executed by a computer, performs a method, comprising:
receiving at least one post-process parameter relating to a first workpiece upon which a plurality of processes has been performed by a plurality of processing tools; and selecting a combination of said plurality of processing tools based upon said post-process parameter.

33. The computer readable program storage device encoded with instructions that, when executed by a computer, performs the method of claim 31, further comprising correlating said post process parameter to said combination of tools used to process said first workpiece.

34. The computer readable program storage device encoded with instructions that, when executed by a computer, performs the method of claim 31, wherein receiving said post-process parameter relating to said first workpiece further comprises receiving at least one of a yield parameter and a performance parameter.

35. The computer readable program storage device encoded with instructions that, when executed by a computer, performs the method of claim 31, wherein selecting said combination relating to said plurality of processing tools further comprises selecting a control thread.

36. The computer readable program storage device encoded with instructions that, when executed by a computer, performs the method of claim 31, further comprising processing a subsequent workpiece.

\* \* \* \* \*